Oct. 10, 1950 — L. S. WILLIAMS — 2,525,056
WEIGHING SCALE PENDULUM GUARD
Filed Jan. 30, 1947 — 3 Sheets-Sheet 1
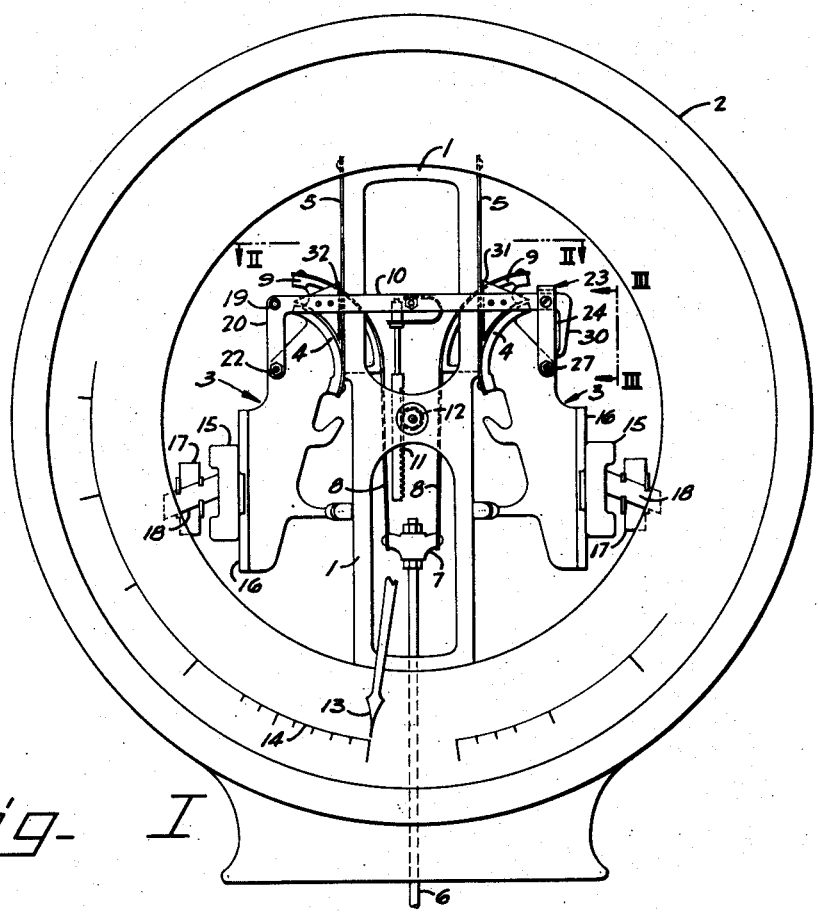
Fig. I
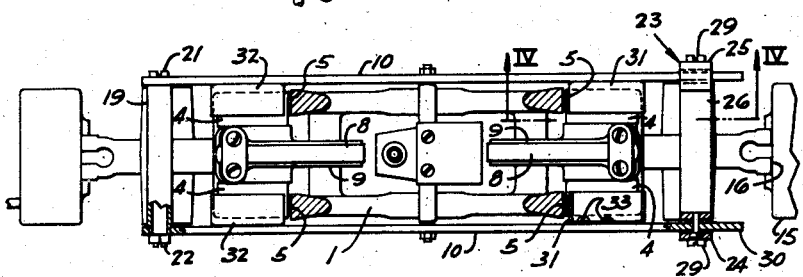
Fig. II
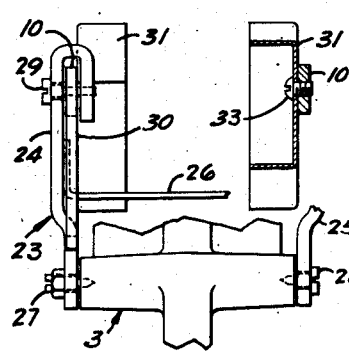
Fig. III
INVENTOR.
Lawrence S. Williams
BY
Marshall and Marshall
ATTORNEYS Oct. 10, 1950         L. S. WILLIAMS         2,525,056
WEIGHING SCALE PENDULUM GUARD
Filed Jan. 30, 1947         3 Sheets-Sheet 2
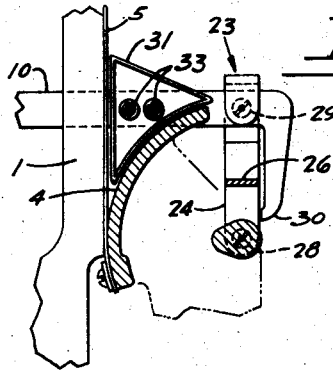
Fig. IV
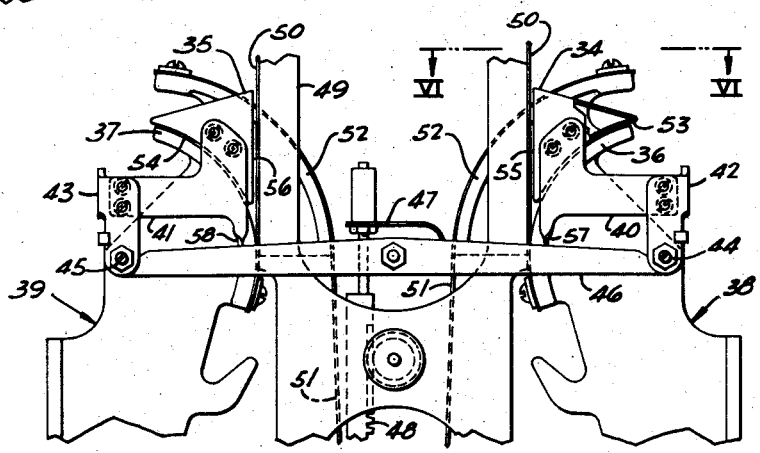
Fig. V
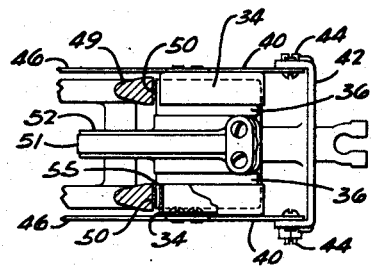
Fig. VI
INVENTOR.
Lawrence S. Williams
BY
Marshall and Marshall
ATTORNEYS Oct. 10, 1950 L. S. WILLIAMS 2,525,056
WEIGHING SCALE PENDULUM GUARD
Filed Jan. 30, 1947 3 Sheets-Sheet 3
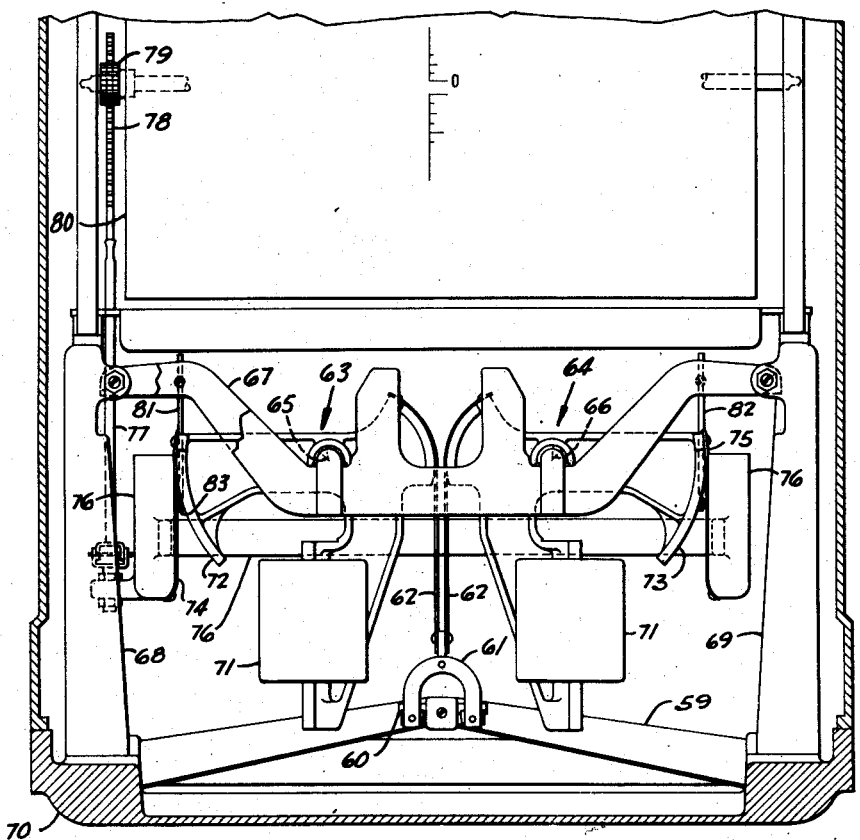
Fig. VII
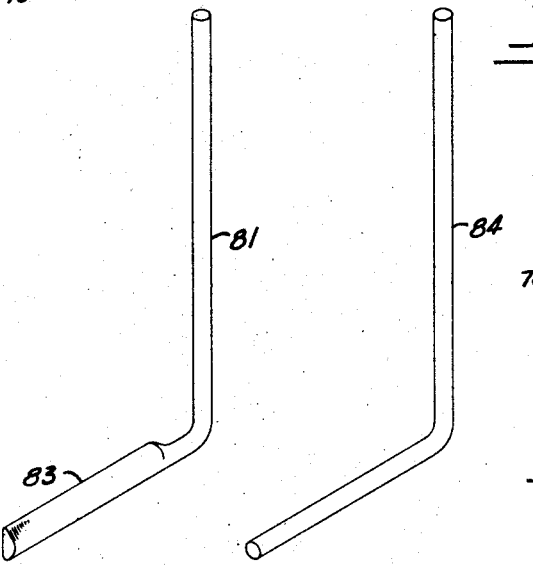
Fig. IX  Fig. X
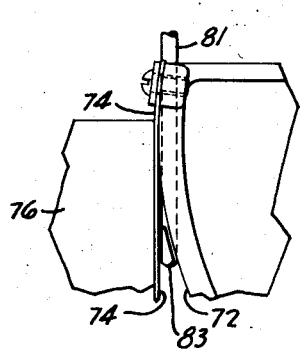
Fig. VIII
INVENTOR.
Lawrence S. Williams
BY
Marshall and Marshall
ATTORNEYS Patented Oct. 10, 1950

2,525,056

UNITED STATES PATENT OFFICE 2,525,056

WEIGHING SCALE PENDULUM GUARD

Lawrence S. Williams, Toledo, Ohio, assignor to Toledo Scale Company, Toledo, Ohio, a corporation of New Jersey Application January 30, 1947, Serial No. 725,356

10 Claims. (Cl. 265—61)

This invention relates to weighing scales and in particular to guards for excluding foreign material from critical parts of a pendulum load counterbalancing mechanism.

Weighing scale pendulums are commonly constructed with arcuate surfaces so that forces may be applied to the pendulums by means of flexible members attached to the ends of and overlying the arcuate surfaces. The radius of an arcuate surface of a pendulum body corresponds to a pivot distance of a lever. Therefore, any foreign material that may be entrapped between the arcuate surface and the flexible member overlying it, in effect, increases the radius of the surfaces and by thus changing the equivalent pivot distance introduces an error into the scale indication.

The principal object of this invention is to provide guards for preventing the entrapment of foreign material between a pendulum sector or arcuate surface and a flexible member or ribbon overlying that surface.

Another object of the invention is to provide an improved mounting for such a guard that maintains the guard accurately in position without imposing any friction on the weighing mechanism.

These and other objects and advantages are apparent from the following description in which reference is made to the accompanying drawings.

In the drawings:

Figure I is a front elevation of a load counterbalancing and load indicating mechanism embodying the invention.

Figure II is a fragmentary plan taken substantially along the line II—II of Figure I.

Figure III is a fragmentary end elevation, with parts broken away and parts shown in section, as seen from the line III—III of Figure I.

Figure IV is a fragmentary elevation as seen from the line IV—IV of Figure II.

Figure V is a fragmentary front elevation showing another embodiment of the invention.

Figure VI is a fragmentary plan view as seen from the line VI—VI of Figure V.

Figure VII is an elevation of another form of weighing scale embodying the invention.

Figure VIII is an enlarged fragmentary detail of a guard used in the scale shown in Figure VII.

Figures IX and X show guard members suitable for use in the scale shown in Figure VII.

These specific figures and the accompanying description are intended merely to illustrate the invention but not to impose limitations on the claims.

A load counterbalancing and indicating mechanism embodying the invention is mounted on a substantially rectangular framework 1 that is mounted vertically within a watchcase-shaped housing 2. A pair of pendulum bodies 3 each having fulcrum sectors 4 are suspended by means of steel ribbons 5 at the sides of the framework 1. Load forces applied to a steelyard rod 6 are transmitted through a yoke 7 to power ribbons 8 that overlie power sectors 9 of the pendulum bodies 3. The power sectors 9 are of greater radius and are located eccentrically with respect to the fulcrum sectors 4 so that a downward pull on the steelyard rod 6 causes the pendulum bodies 3 to rotate with the fulcrum sectors 4 rolling up the sides of the framework 1. A set of compensating bars 10 that are pivotally supported from the turning centers of the pendulum bodies 3 support a rack 11 that meshes with a pinion 12 on the shaft of an indicator 13 such that the vertical movement of the pendulum bodies 3 is utilized to drive the indicator 13 over an arcuate chart 14 mounted in the housing 2.

Major weights 15 are mounted from tracks 16 formed on the pendulum bodies 3 while minor weights 17 are mounted on tracks 18 extending laterally from the major weights 15. The weights 15 and 17 by their position with respect to the sectors 4 and 9 provide counterbalancing forces such that the indicator 13 rotates through equal angles for equal increments of load.

The compensating bars 10 are narrow strips that extend horizontally from one of the pendulum bodies 3 past the framework 1 to the other of the pendulum bodies. At one end the compensating bars 10 are held in spaced relation by a hollow tube 19, the ends of which are shouldered and riveted into the compensating bars 10. The compensating bars have depending leg portions 20 extending downwardly from the ends of the spacing tube 19 and the lower ends of these downwardly extending leg portions are provided with screws 21 and 22, the cone-pointed ends of which engage the corresponding one of the pendulum bodies 3 at the center of its fulcrum sector 4. The other ends of the compensating bars 10 are supported by a yoke 23 that consists of two upright side members 24 and 25 held in spaced relation by a connecting bar 26. The lower ends of the side members 24 and 25 of the yoke 23 are provided with cone-pointed screws 27 and 28 that engage the other of the pendulum bodies 3 at the center of its fulcrum sector 4.

The upper ends of the side members 24 and 25 are bent inwardly and downwardly to form parallel surfaces between which the compensating bars 10 are guided. Screws 29 having cylindrically-shaped portions are threaded through the upper ends of the side members 24 and 25 with the cylindrical shank portions passing through holes in the compensating bars 10. The compensating bars 10 are thus supported from the turning centers of the pendulum bodies 3 so that they execute a vertical movement that is directly proportional to the angular rotation of the pendulum bodies.

The compensating bars 10 are provided with integral depending hook-like portions 30, the ends of which normally are slightly spaced from the adjacent surfaces of the side members 24 and 25 of the yoke 23. The hook-like depending portions of the compensating bars by engagement with the side members of the yoke 23 prevent the pendulum bodies from swinging away from the sides of the framework 1.

The entrance of foreign material between the fulcrum sectors 4 and the supporting ribbons 5 or between the power sectors 9 and the power ribbons 8 causes changes in the effective radii of these sectors and, thereby introduces error into the indications of the weighing scale. Since the space between the power ribbons 8 and the power sectors 9 opens downwardly and, because these members are usually in contact, there is little danger that foreign material will be entrapped therebetween. The space between the fulcrum sectors 4 and the supporting ribbons 5 opens upwardly and normally these members are in contact over only a short portion of the fulcrum sectors 4. Thus there is a very material possibility that foreign material in the housing 2 may settle on the exposed surfaces of the fulcrum sectors 4. Any foreign material that gets onto these surfaces becomes quite firmly fixed to these surfaces after a few weighings because of the pressure exerted between the ribbons 5 and the fulcrum sectors during a weighing operation.

To protect these surfaces of the pendulum bodies 3 guards 31 and 32 supported from the compensating bars 10 are provided. These guards may be in the form of triangular dish-like stampings the bottoms of which are juxtaposed to the compensating bars 10 and secured thereto by screws 33. The lower sides of the guards 31 and 32 are concave cylindrical surfaces that conform to the curvature of the fulcrum sectors 4 and which, when the guards are installed, closely overlie the sector surfaces without actually touching them. The vertical sides of the guards 31 and 32 are flat and when the guards are mounted in position lie closely adjacent to but spaced from straight portions of the supporting ribbons 5. The third sides of the guard member 31 and 32, the upper sides, serve as a roof to prevent material from dropping in and lodging between the curved wall and straight wall of the guards 31 and 32 and thereby increasing the weight of these members.

The concave surfaces of the guards 31 and 32 are sufficiently long to overlie all of the exposed portions of the fulcrum sectors 4 when the counterbalancing mechanism is not loaded. As load is applied and the pendulum bodies roll upwardly along the sides of the framework 1 the guard members 31 and 32 are carried upwardly at the same rate and, therefore, do not interfere with the operation of the scale. The curved surfaces being long enough to overlie the fulcrum sectors 4 in the zero position are therefore long enough to protect these surfaces under all conditions of loading.

The clearance between the guards 31 and the adjacent supporting ribbons 5 must be somewhat greater than the clearance between the hook-like portions 30 of the compensating bars and the adjacent yoke portions 24 and 25 so that contact between the yoke portions and the hook-like portions 30 will arrest the swinging of the pendulum bodies away from the framework 1 before there is contact between the ribbons 5 and the guards 31. The contact to the latter point would introduce friction into the weighing mechanism whereas contact between the yoke 23 and the hook-like compensating bar portions 30 does not have that effect.

Referring to Figures V and VI guard members 34 and 35 for covering fulcrum sectors 36 and 37 of pendulum bodies 38 and 39 are mounted on arms 40 and 41 that are attached to compensating bar yokes 42 and 43. The yokes 42 and 43 are pivotally mounted from cone-pointed screws 44 and 45 that engage the pendulum bodies 38 and 39 at the centers of the fulcrum sectors 36 and 37. Compensating bars 46 that are supported on the screws 44 and 45 carry at their midpoints a rack support 47 and rack 48 that engages a pinion an on indicator shaft. The pendulum bodies 38 and 39 are supported from a generally rectangular framework 49 by means of flexible ribbons 50 that are attached to the ends of the sectors 36 and 37 and to the upper end of the framework 49. Load forces are applied to the pendulum by means of power ribbons 51 that overlie power sectors 52.

By mounting the guards 34 and 35 from the yokes 42 and 43 the spacing of concave cylindrical portions 53 and 54 of the guards 34 and 35 with respect to the fulcrum sectors 36 and 37 may be very positively controlled. Likewise, this method of mounting the guards permits closer clearance between vertical surfaces 55 and 56 of the guards and the supporting ribbons 50. This latter clearance is determined by the angular position of the yokes with respect to the compensating bars 46 and the framework 49. Therefore the arms 40 and 41 are provided with feet 57 and 58 that engage the upper surfaces of the compensating bars 46 so that the angular positions of the yokes 42 and 43 are positively maintained.

Some weighing scales are constructed with pendulums that rotate about fixed centers and which carry a member including a rack that meshes with a pinion to drive an indicator. Such a pendulum mechanism is illustrated in Figure VII. Load forces that are transmitted through a lever 59 are transmitted through a load pivot 60 and a stirrup and bearing assembly 61 to power ribbons 62 of a pair of pendulum bodies 63 and 64. The pendulum bodies 63 and 64 are supported on knife edges 65 and 66 that rest in bearings in a bridge 67 that is supported on standards 68 and 69 erected from a base 70. Each of the pendulum bodies 63 and 64 is provided with a pendulum weight 71 that provides load counter-balancing capacity and is provided with arcuate surfaces 72 and 73 that are concentric with the knife edges 65 and 66 and that, by means of ribbons 74 and 75, carry a loading frame 76 that is reciprocated up and down by motion of the pendulums. One end of the loading frame 76 supports a rack drive 77 having a rack 78 that meshes with a pinion 79 to rotate a chart 80 through increments of angle that are exactly proportional to increments of load applied to the lever 59.

Weighing scales incorporating pendulum mechanisms of this type are occasionally used in locations where they are infested with various varieties of insects. These insects cause trouble by getting caught and crushed between cooperating parts of the weighing mechanism. One point of difficulty in this respect is the space between the arcuate surfaces 72 or 73 and the supporting ribbons 74 or 75. This spot is particularly troublesome because it is open while the scale is at rest and closes upon application of load. The corresponding spaces between the power ribbons 62 and the power sectors of the pendulum are not subject to this difficulty because this space is closed when the scale is at zero.

This difficulty is corrected by sector guards 81 and 82 that dislodge any insects that may have found their way onto the arcuate surfaces 72 and 73 or onto the ribbons 74 and 75. The guards 81 and 82 depend from the bridge 67 and have horizontally directed portions 83 that pass between and just out of contact with the arcuate surfaces and the ribbons 74 and 75. Referring to Figure VIII, the position of the horizontal portion 83 of the guard member 81 relative to the sectors is shown. Referring to Figures VIII and IX the horizontal portion 83 is shown shaped to conform to the adjacent surfaces of the arcuate surface 72 and the ribbon 74.

Satisfactory results may be obtained in many installations without the necessity of shaping the horizontal portion 83 of the guard 81 to conform to the adjacent surfaces of the tape and pendulum sectors. A much simpler though satisfactory guard consists of a round wire 84 (Figure X) that is merely bent to give a horizontal portion that may be located between the arcuate surfaces 72 or 73 and the adjacent ribbons 74 or 75.

The guards for the scale shown in Figure VII may be much simpler than the other because the crevice to be protected opens downwardly and any foreign material tends to fall free of the pendulum. In the first example the crevice opened upwardly so that it was necessary to catch or deflect the foreign material to prevent it from lodging between the sector surfaces and the supporting ribbons.

These specific embodiments of the invention illustrate preferred methods of incorporating guard members into a weighing scale. The guard members may be adapted for use in other designs of weighing scale mechanism without departing from the spirit and scope of the invention.

Having described the invention, I claim:

1. In a weighing scale employing as an automatic counterbalance a body to which force is applied by a flexible member overlying a formed convex surface on the body, a guard for excluding material from the space between the flexible member and the formed surface, said guard comprising a member formed with surfaces that are juxtaposed the formed surface of the body and an adjacent straight portion of the flexible member, and means fixed in relation to the center of rotation of the formed surface of the body for supporting said guard in the bight between the formed surface of the body and the flexible member.

2. In a weighing scale employing as an automatic counterbalance a body to which force is applied by a flexible member overlying a sector formed on the body, a guard for excluding material from the space between the flexible member and the sector, the guard being located in the space between the sector and an adjacent straight portion of the flexible member, and having surfaces conforming to the sector and the member, and means fixed in relation to the center of rotation of the sector for supporting the guard in said space out of contact with the sector or the flexible member.

3. In a weighing scale employing as an automatic counterbalance a body to which force is applied by a flexible member overlying a sector formed on the body, a guard for preventing the entrapment of foreign material between the sector and the overlying flexible member, the guard comprising a member having a first side conforming to the curvature of the sector, and a second side conforming to an adjacent straight portion of the flexible member, said guard overlying that portion of the sector not covered by the flexible member, and means fixed in relation to the center of rotation of the sector for supporting the guard in closely spaced relation to the sector and the flexible member.

4. In a weighing scale employing as an automatic counterbalance a body to which force is applied by a flexible member overlying a sector formed on the body, a guard for preventing the entrapment of material between the sector and the overlying portion of the flexible member, the guard consisting of a member having at least two turned edges, the first of the turned edges forming a concave cylindrical surface conforming to the sector, the second of the turned edges forming a flat surface, and means fixed in relation to the center of rotation of the sector for supporting the guard with the concave surface closely spaced from the sector and the flat surface closely spaced from a straight portion of the flexible member.

5. In a weighing scale employing a pair of floating pendulums as load counterbalancing elements, in combination, a pair of compensating bars connecting the turning centers of the pendulums, and guards supported from the compensating bars for preventing entrapment of material between sectors of the floating pendulums and flexible members overlying the sectors, said guards having surfaces that conform to and are spaced from the sectors and straight portions of the flexible members.

6. In a weighing scale employing a pair of floating pendulums as automatic load counterbalancing mechanism, in combination, a pair of compensating bars extending between the pendulums, yokes pivotally mounted on the pendulums for supporting the ends of the compensating bars, and guards for preventing entrapment of material between sectors of the pendulums and cooperating flexible members, said guards having surfaces conforming to the sectors and being supported from the yokes and compensating bars so that the guards overlie the portions of the sectors not engaged by the cooperating flexible members.

7. In a weighing scale employing as an automatic counterbalance a body to which force is applied by a flexible member cooperating with an arcuate surface on the body, a guard for excluding material from the space between the flexible member and the cooperating arcuate surface comprising a member supported from the scale in fixed relation to the path of the arcuate surface and extending across the width of the arcuate surface.

8. In a weighing scale employing as an automatic counterbalance a body to which forces are applied by flexible members, in combination, an arcuate surface on the body, a flexible member that wraps onto the arcuate surface with change in the load being counterbalanced, and a guard member that is supported in fixed relation to the center of rotation of the arcuate surface and that occupies a portion of the space between the arcuate surface and the flexible member.

9. In a weighing scale employing a pendulum having a sector that is concentric with the axis of rotation of the pendulum and that receives in force transmitting relation a flexible member attached to the sector and to a portion of the scale extending tangentially to the sector, a guard for excluding foreign material from the bight between the sector and the tangentially extending portion of the flexible member, said guard comprising a member having a straight side juxtaposed to the flexible member and having a concave arcuate side juxtaposed to the sector, and non-rotative means supported in fixed relation to the axis of rotation of the sector for supporting the guard in fixed relation to the axis of rotation of the pendulum.

10. In a weighing scale embodying a pendulum having a sector that is concentric with the axis of rotation of the pendulum and a flexible member that overlies the sector and is attached to the sector and to a tangentially extending member of the weighing scale, a guard for excluding foreign material from the space between the sector and the tangentially extending portion of the flexible member, a non-rotating member of the scale in fixed relation to the axis of rotation of the pendulum, said guard being rigidly supported from said non-rotating member and having surfaces juxtaposed to and shaped to conform to the sector and to the tangentially extending member.

LAWRENCE S. WILLIAMS.

No references cited.